United States Patent
Matsumoto

(10) Patent No.: US 8,619,514 B1
(45) Date of Patent: Dec. 31, 2013

(54) THERMALLY-ASSISTED RECORDING (TAR) HEAD WITH WAVEGUIDE HAVING TAPERED REGION COUPLED TO NEAR-FIELD TRANSDUCER

(75) Inventor: Takuya Matsumoto, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/571,425

(22) Filed: Aug. 10, 2012

(51) Int. Cl.
*G11B 11/00* (2006.01)

(52) U.S. Cl.
USPC .................................................. 369/13.33

(58) Field of Classification Search
USPC .................. 369/13.02, 13.32, 13.33
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,272,079 B2 | 9/2007 | Challener | |
| 7,969,826 B2 | 6/2011 | Naniwa et al. | |
| 8,102,736 B2 * | 1/2012 | Takayama et al. | 369/13.33 |
| 8,139,447 B2 | 3/2012 | Sasaki et al. | |
| 8,451,705 B2 * | 5/2013 | Peng et al. | 369/112.27 |
| 2004/0085862 A1 | 5/2004 | Matsumoto et al. | |
| 2009/0052078 A1 * | 2/2009 | Tanaka et al. | 360/59 |
| 2010/0091618 A1 * | 4/2010 | Schabes et al. | 369/13.02 |
| 2010/0260015 A1 * | 10/2010 | Sasaki et al. | 369/13.02 |
| 2011/0096639 A1 | 4/2011 | Matsumoto | |
| 2011/0170381 A1 | 7/2011 | Matsumoto | |
| 2011/0181979 A1 * | 7/2011 | Jin et al. | 360/59 |
| 2011/0205661 A1 * | 8/2011 | Komura et al. | 360/59 |
| 2011/0216635 A1 * | 9/2011 | Matsumoto | 369/13.33 |
| 2011/0228420 A1 * | 9/2011 | Hara et al. | 360/59 |
| 2011/0235480 A1 | 9/2011 | Goulakov et al. | |
| 2012/0075967 A1 * | 3/2012 | Chou et al. | 369/13.33 |
| 2012/0082016 A1 * | 4/2012 | Komura et al. | 369/13.33 |
| 2013/0016591 A1 * | 1/2013 | Tomikawa et al. | 369/13.02 |

OTHER PUBLICATIONS

Ikkawi et al., "Near-Field Optical Transducer for Heat-Assisted Magnetic Recording for Beyond-10-Tbit/in2 Densities", J. Nanoelectron. Optoelectron. 2008, vol. 3, No. 1, pp. 44-54.

* cited by examiner

*Primary Examiner* — Brenda Bernardi
(74) *Attorney, Agent, or Firm* — Thomas R. Berthold

(57) ABSTRACT

A thermally-assisted recording (TAR) head for recording data in data tracks of a TAR disk has an air-bearing slider that supports a near-field transducer (NFT) and an optical waveguide that directs laser light to the NFT. The NFT has an output end at the slider's air-bearing surface (ABS) located between the write pole and the optical waveguide in the along-the-track direction. The NFT output end is generally triangularly shaped with an apex facing the write pole and a back edge wider than the apex in the cross-track axis direction facing the waveguide. The surface of the waveguide facing the NFT back edge is tapered, with a width in the cross-track axis direction at a region recessed from the ABS and a smaller width in the cross-track axis direction at an end near the ABS.

11 Claims, 8 Drawing Sheets

US 8,619,514 B1

THERMALLY-ASSISTED RECORDING (TAR) HEAD WITH WAVEGUIDE HAVING TAPERED REGION COUPLED TO NEAR-FIELD TRANSDUCER

TECHNICAL FIELD

This invention relates generally to a thermally-assisted recording (TAR) disk drive, in which data are written while the magnetic recording layer on the disk is at an elevated temperature, and more specifically to an improved TAR head.

BACKGROUND OF THE INVENTION

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is thermally-assisted recording (TAR), also called heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed TAR systems, the magnetic recording material is heated to near or above its Curie temperature. The recorded data is then read back at ambient temperature by a conventional magnetoresistive read head. TAR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed TAR disk drive uses a laser source and an optical waveguide coupled to a near-field transducer (NFT) for heating the recording material on the disk. A "near-field" transducer refers to "near-field optics", wherein the passage of light is through an element with subwavelength features and the light is coupled to a second element, such as a substrate like a magnetic recording medium, located a subwavelength distance from the first element. The NFT is typically located at the air-bearing surface (ABS) of the air-bearing slider that also supports the read/write head and rides or "files" above the disk surface.

A NFT with a generally triangular output end is described in US published applications 20110096639 and 20110170381, both assigned to the same assignee as this application. In this NFT an evanescent wave generated at a surface of the waveguide couples to surface plasmons excited on the surface of the NFT 74 and a strong optical near-field is generated at the apex of the triangular output end.

What is needed is a TAR head with improved efficiency of the NFT so as to reduce the required laser power.

SUMMARY OF THE INVENTION

The invention relates to a thermally-assisted recording (TAR) head for recording data in data tracks of a TAR disk. An air-bearing slider supports a near-field transducer (NFT) and an optical waveguide that directs laser light to the NFT. The NFT has an output end at the slider's air-bearing surface (ABS) located between the write pole and the optical waveguide in the along-the-track direction. The NFT output end is generally triangularly shaped with an apex facing the write pole and a back edge wider than the apex in the cross-track axis direction facing the waveguide. The surface of the waveguide facing the NFT back edge is tapered, with a width W1 in the cross-track axis direction at a region recessed from the ABS and a width W2 less than W1 in the cross-track axis direction at an end near the ABS. The end of the optical waveguide having the width W2 may be substantially coplanar with the ABS or may be recessed from the ABS.

When laser light is introduced into the waveguide, an evanescent wave is generated at the waveguide's tapered surface and couples to a surface plasmon excited on the surface of the NFT. The surface plasmon propagates to the NFT output end back edge. At the apex of the NFT output an optical near-field spot is generated in the space at the ABS between the apex and the write pole. The write pole applies a magnetic field at the optical spot. The intensity of the evanescent wave at the center of the waveguide increases as the width of the waveguide decreases towards the ABS. The size of the evanescent wave is decreased in the cross-track direction and the intensity of the evanescent wave is increased in the along-the-track direction at the ABS, so that light energy is concentrated at the center of the waveguide and directed to back edge of the NFT output end. The tapering of the width of the waveguide toward the end of the waveguide concentrates light energy at the center of the waveguide, and the evanescent wave couples to the surface plasmon efficiently. This allows for a reduction in laser power.

For a fuller understanding of the nature and advantages of the present invention, reference should be made to the following detailed description taken together with the accompanying figures.

DETAILED DESCRIPTION OF THE INVENTION

Figure 1:
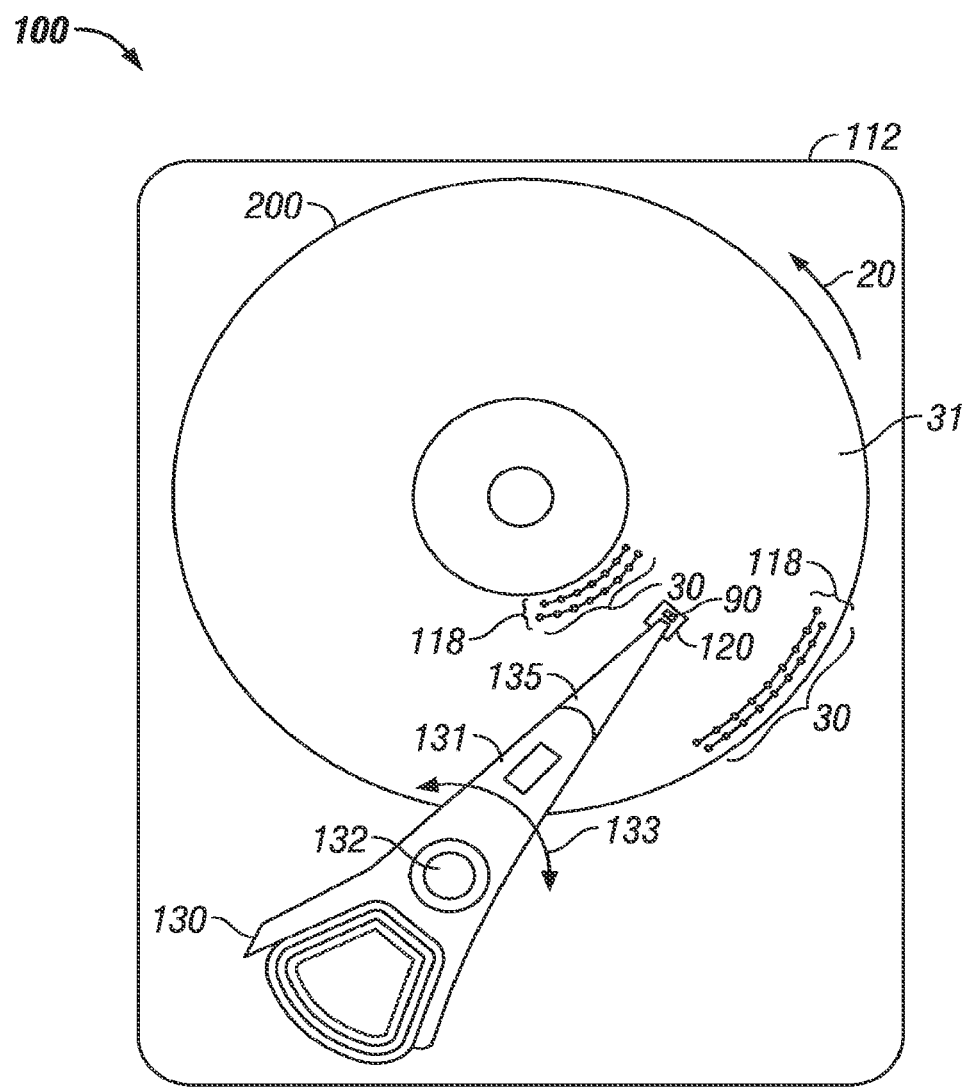
FIG. 1 is a top view of a thermally-assisted recording (TAR) disk drive according to the invention.

FIG. 1 is a top view of a thermally-assisted recording (TAR) disk drive 100 according to the invention. In FIG. 1, the TAR disk drive 100 is depicted with a disk 200 with magnetic the recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the TAR disk drive may instead use disks in which the recording layer 31 is a conventional continuous magnetic recording layer of magnetizable material.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the TAR head (not shown), which includes a magnetoresistive read head, an inductive write head, the near-field transducer (NFT) and optical waveguide. A semiconductor laser 90 with a wavelength of 780 to 980 nm may used as the TAR light source and is depicted as being supported on the top of slider 120. Alternatively the laser may be located on suspension 135 and coupled to slider 120 by an optical channel. As the disk 200 rotates in the direction of arrow 20, the movement of actuator 130 allows the TAR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and TAR head associated with each surface of each disk.

Figure 2:
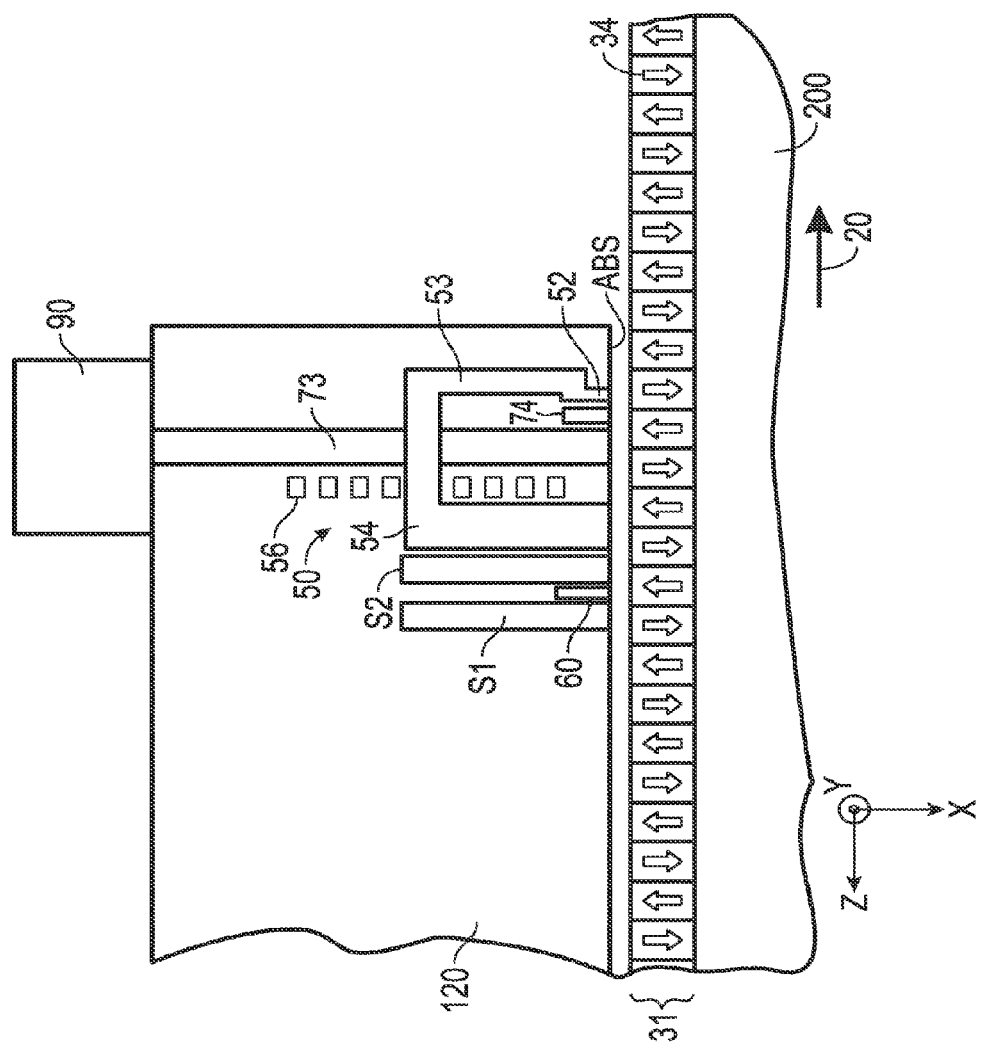
FIG. 2 depicts a sectional view, not drawn to scale because of the difficulty in showing the very small features, of an air-bearing slider for use in TAR disk drive and a portion of a TAR disk according to the invention.

In the following drawings, the X direction denotes a direction perpendicular to the air-bearing surface (ABS) of the slider, the Y direction denotes a track width or cross-track direction, and the Z direction denotes an along-the-track direction. FIG. 2 is a schematic cross-sectional view illustrating a configuration example of a TAR head according to the present invention. In FIG. 2, the disk 200 is depicted with the recording layer 31 being a conventional continuous magnetic recording layer of magnetizable material with magnetized regions or "bits" 34. The air-bearing slider 120 is supported by suspension 135 and has an ABS that faces the disk 200 and supports the magnetic write head 50, read head 60, and magnetically permeable read head shields 51 and S2. A recording magnetic field is generated by the write head 50 made up of a coil 56, a magnetic pole 53 for transmitting flux generated by the coil 56, a main pole 52, and a return pole 54. A magnetic field generated by the coil 56 is transmitted through the magnetic pole 53 to the main pole 52 arranged in a vicinity of an optical near-field transducer (NFT) 74. At the moment of recording, the recording layer 31 of disk 200 is heated by an optical near-field generated by the NFT 74 and, at the same time, a region or "bit" 34 is magnetized and thus written onto the recording layer 31 by applying a recording magnetic field generated by the main pole 52.

A semiconductor laser 90 is mounted to the top surface of slider 120. An optical waveguide 73 for guiding light from laser 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide. A multi-mode waveguide is not preferred because it may cause power fluctuations due to intermode interference.

Figure 3A:
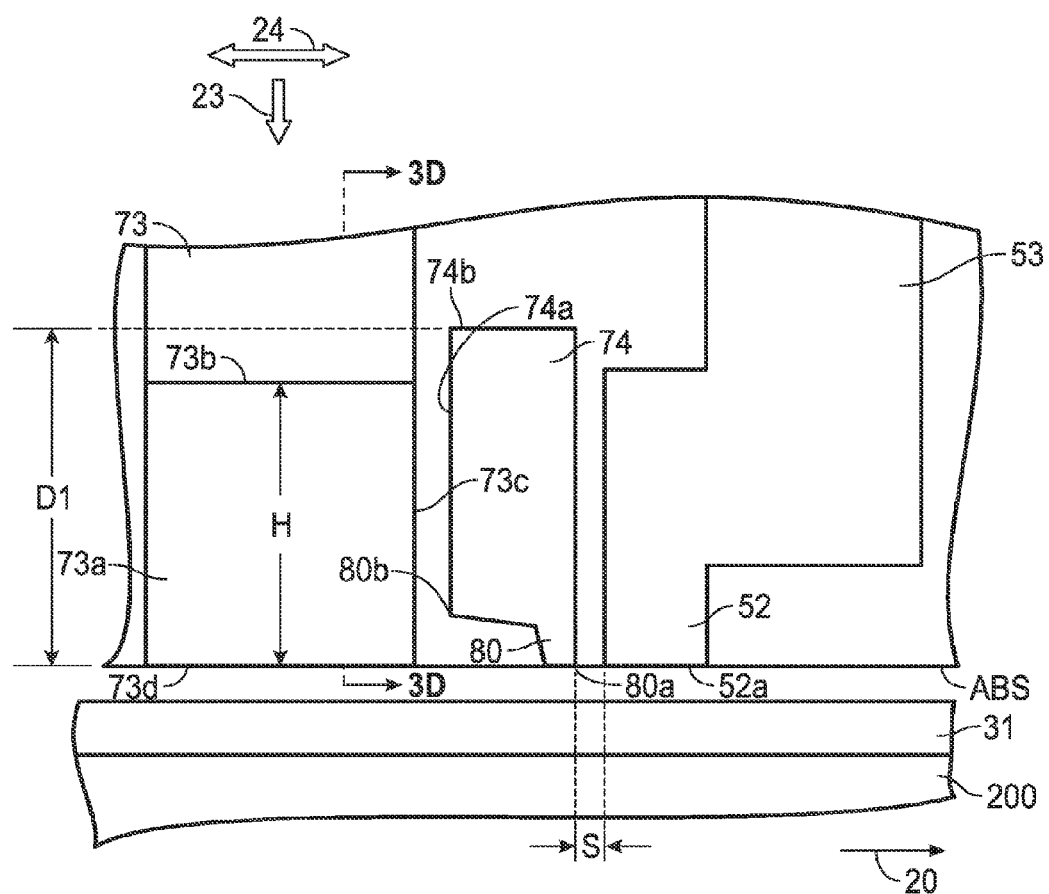
FIG. 3A is a side sectional view of the layers of material making up the write pole, the near-field transducer (NFT) and the waveguide according to the invention and shown in relation to the recording layer on the disk.

FIG. 3A is a side sectional view of the layers of material making up the write pole 52, the NFT 74 and the waveguide 73 and shown in relation to disk 200 with recording layer 31. The write pole 52 is typically a layer of high-moment material like FeCo and has a pole tip 52a at the ABS. The waveguide 73 is a layer of core material generally parallel to the write pole 52 layer with a length orthogonal to the ABS and a tapered region 73a extending from the ABS to a region 73b recessed a distance H from the ABS. The waveguide 73 has a generally planar surface 73c that faces and is parallel to NFT 74 layer and an end 73d at the ABS. The NFT 74 layer is a conductive low-loss metal (preferably Au, but also Ag, Al or Cu), is generally parallel to waveguide 73 layer and write pole 52 layer, and is located between and spaced from the waveguide 73 layer and the write pole 52 layer. The NFT 74 layer has a surface 74a that faces and is spaced from waveguide surface 73c. The NFT 74 layer has an output tip 80 at the ABS and height D1 from the ABS to an input edge 74b recessed from the ABS. The distance H can be less than or greater than D1. In one example, D1 is about 850 nm, and H can be between about 120 and 1400 nm. The NFT output tip 80 has a height D2 from the ABS to a region recessed from the ABS. When light is introduced into the waveguide 73, an evanescent wave is generated at the surface 73c and couples to a surface plasmon excited on the surface 74a of NFT 74. Arrow 23 shows the direction of propagation of light in waveguide 73 and arrow 24 shows the direction of polarization of the light. The surface plasmon propagates to the output tip 80. The output tip 80 has an apex 80a that faces the write pole tip 52a and a back edge 80b that faces the waveguide surface 73c. At the apex 80a an optical near-field spot is generated in the space at the ABS between the output tip apex 80a and the write pole tip 52a. The write pole tip 52a applies a magnetic field at the optical spot. In one example, the distance S between the apex 80a and the write pole tip 52a is about 20 nm.

Figure 3B:
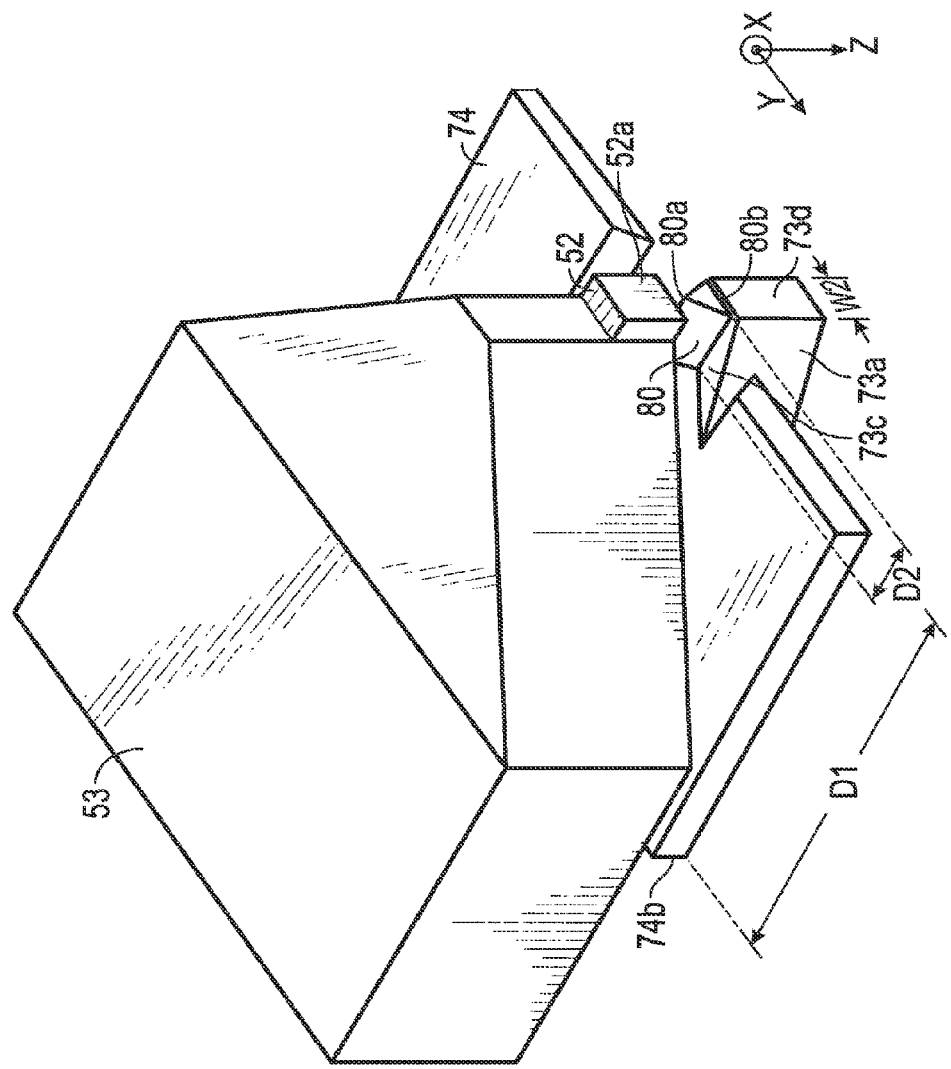
FIG. 3B is a perspective view of the layers of material making up the write pole, the NFT and the tapered waveguide according to the invention.
Figure 3C:
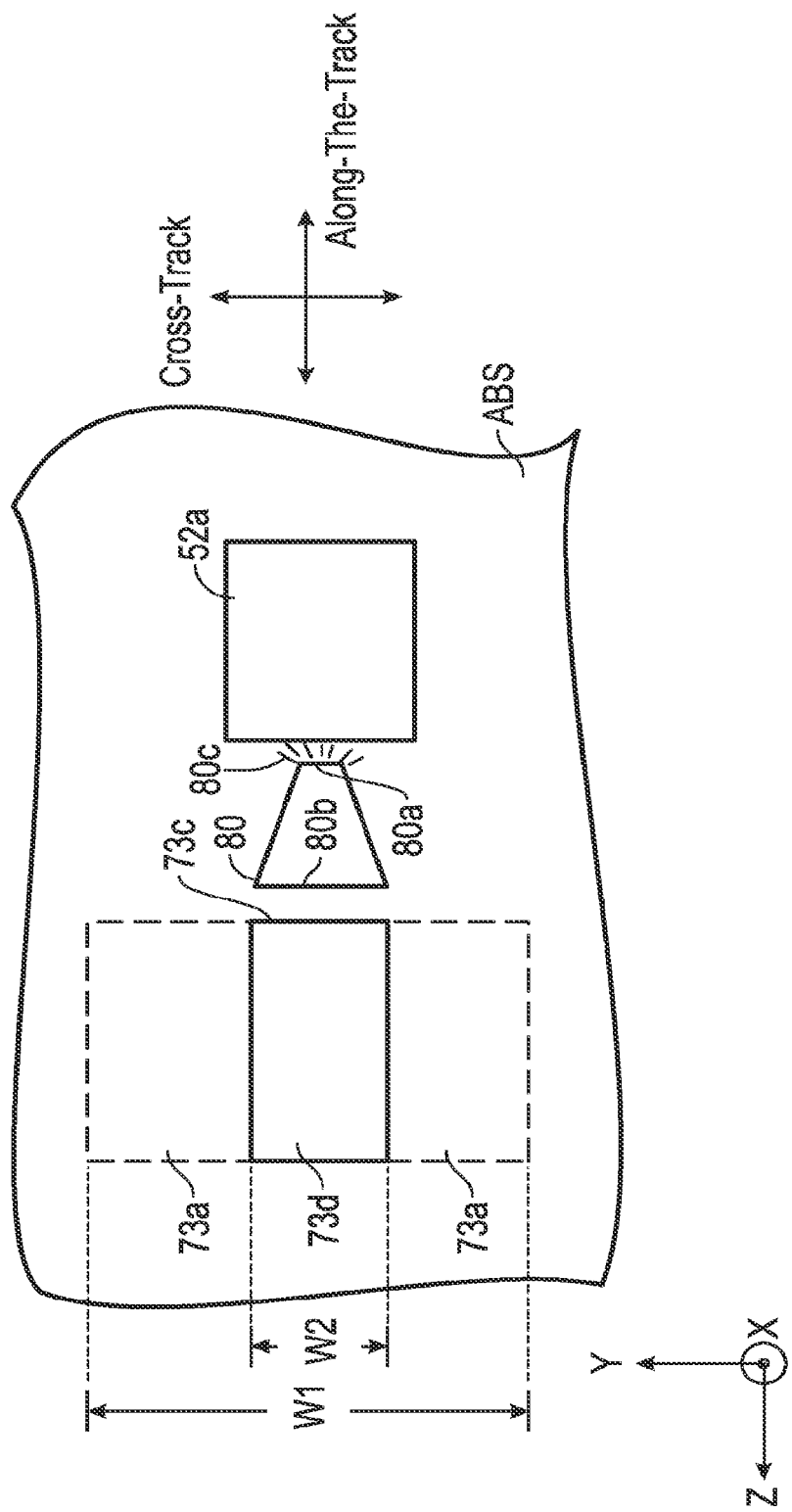
FIG. 3C is a view of a portion of the slider air-bearing surface (ABS) showing the relative orientations of the tapered waveguide, the NFT output tip and the write pole tip.

FIG. 3B is a perspective view of the layers of material making up the write pole 52, the NFT 74 and the waveguide 73. FIG. 3C is a view of a portion of the ABS showing the relative orientations of the waveguide end 73d, the NFT output tip 80 and the write pole tip 52a. The output tip 80 has a generally triangular shape at the ABS with an apex 80a that faces the write pole tip 52a and a back edge 80b that faces the waveguide surface 73c and is wider than apex 80a in the cross-track direction. Thus the output tip 80 has a back edge 80b at the ABS perpendicular to a polarization direction of incident light transmitted through the waveguide (arrow 24 in FIG. 3A) that gradually becomes smaller toward the apex 80a where an optical near-field is generated. The small lines 80c represent the optical spot generated at the output tip apex 80a. FIGS. 3B-3C show the tapered region 73a of waveguide 73 and how it tapers from a width W1 at a region recessed from the ABS down to a smaller width W2 that is generally at least the same cross-track width as the back edge 80*b* of NFT output tip 80. The back edge 80*b* may have a cross-track width within a range of from about 50 to 180 nm.

Figure 3D:
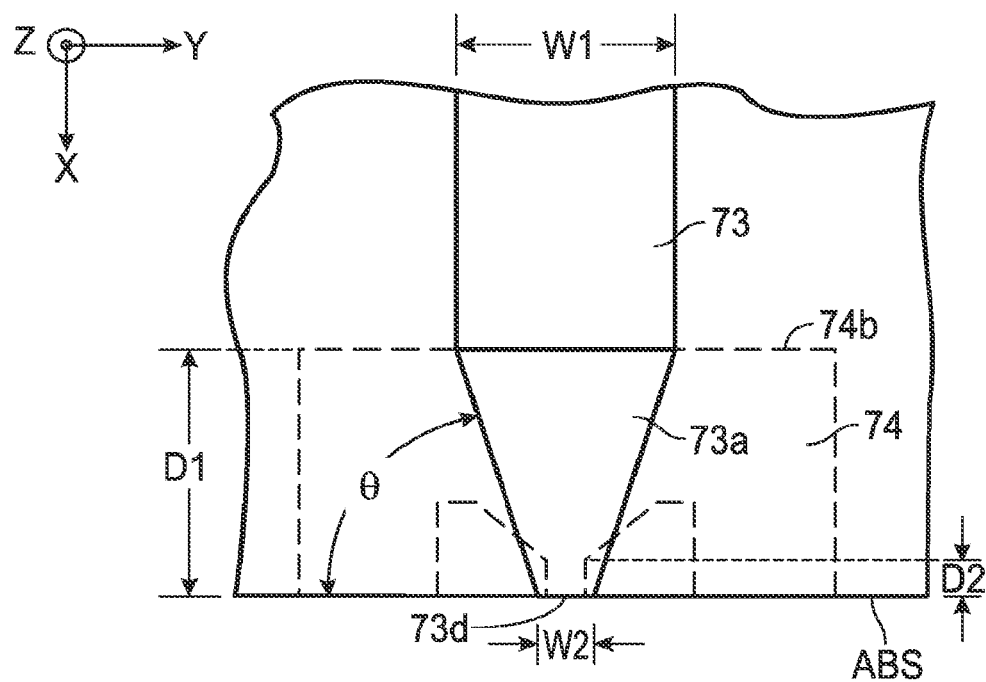
FIG. 3D is a view of section 3D-3D of FIG. 3A and shows the waveguide with width W2 at the ABS and width W1 at a region recessed from the ABS.

FIG. 3D is a view of section 3D-3D of FIG. 3A and shows the waveguide 73 with width W2 at the end 73*d* at the ABS and width W1 at region 73*b* recessed from the ABS. In the example of FIG. 3D, the recession distance H (FIG. 3A) is approximately equal to D1. The dotted line is the outline of NFT 74 with output tip 80 having a height D2 from the ABS. The taper angle is the angle $\theta=\tan^{-1}[2H/(W1-W2)]$. The tapering of the waveguide 73 increases the coupling efficiency between the evanescent wave and the surface plasmon. The intensity of the evanescent wave was computed and compared at waveguide region 73*b* (width W1) and waveguide end 73*d* (width W2) for a waveguide with a $Ta_2O_5$ core and $Al_2O_3$ cladding. The waveguide 73 layer had a thickness (Z direction) of 250 nm, a W1 width of 500 nm, and a W2 the width of 100, with D1 being 850 nm. The polarization direction (arrow 24) of the light was in the thickness direction of the waveguide core. The intensity of the evanescent wave at the center of the waveguide increases as the width of the waveguide decreases towards the ABS. The size of the evanescent wave is decreased in the cross-track direction (Y direction) and the intensity of the evanescent wave is increased in the along-the-track direction (Z direction) at the ABS, so that light energy is concentrated at the center of the waveguide at surface 73*a* and directed to back edge 80*b* of the NFT output tip 80 (see FIG. 3C). By comparison, for a similar waveguide with no tapered region 73*a* wherein the width of the waveguide at the ABS is wider than the width of the NFT output tip back edge 80*b*, the evanescent wave generated by the waveguide at points distant from the output tip is not coupled to the surface plasmon. By reducing the width of the waveguide at the end of the waveguide as in this invention, light energy is concentrated at the center of the waveguide, and the evanescent wave couples to the surface plasmon efficiently.

Figure 4A:
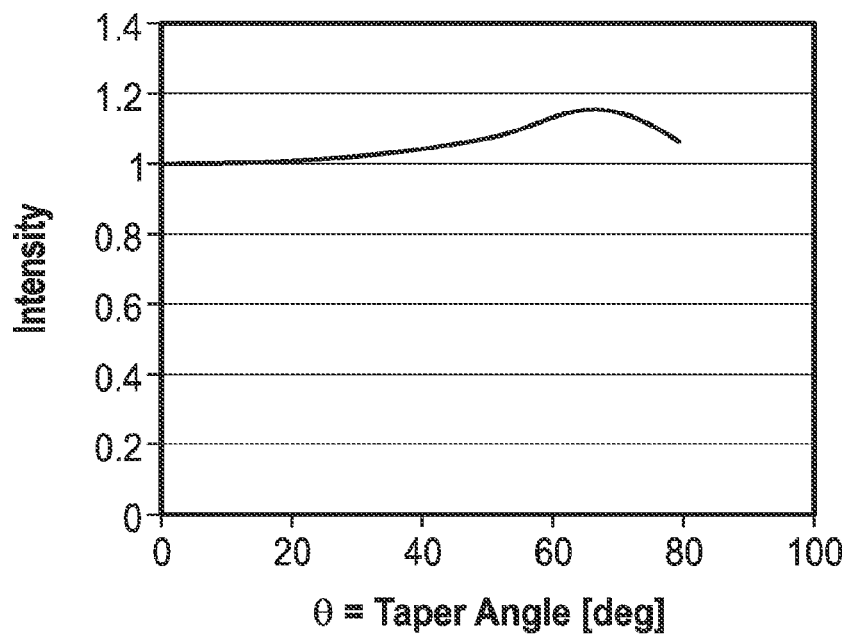
FIG. 4A is a graph of optical near-field intensity as a function of taper angle of the tapered waveguide.
Figure 4B:
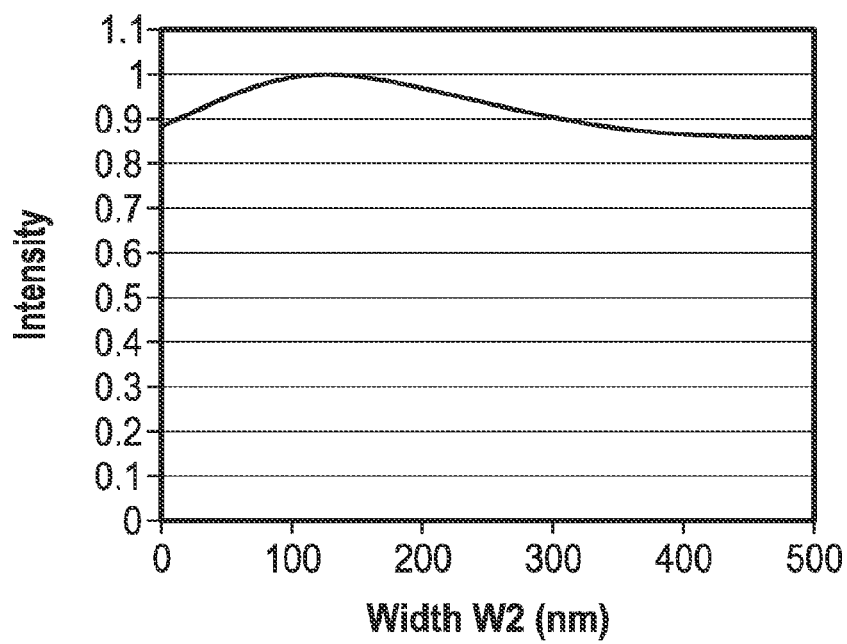
FIG. 4B is a graph of optical near-field intensity as a function of the cross-track width W2 of the waveguide end.

FIG. 4A shows the relation between the optical near-field intensity and the taper angle θ for a waveguide where W1 was 500 nm and W2 was fixed at 100 nm. As shown, the peak intensity occurs near 70 degrees, with at least 90% of the peak intensity being achieved for a taper angle between 40 and 85 degrees. FIG. 4B shows the relation between the optical near-field intensity and the waveguide end 73*d* cross-track width W2 for a waveguide where D1 was 850 nm and W1 was 500 nm. As shown, the peak intensity occurs near W2=120 nm, which for the dimensions of this example corresponds to a taper angle of θ=77 degrees. FIG. 4B shows that at least 90% of the peak intensity is achieved for W2 between about 10 and 300 nm.

Figure 5A:
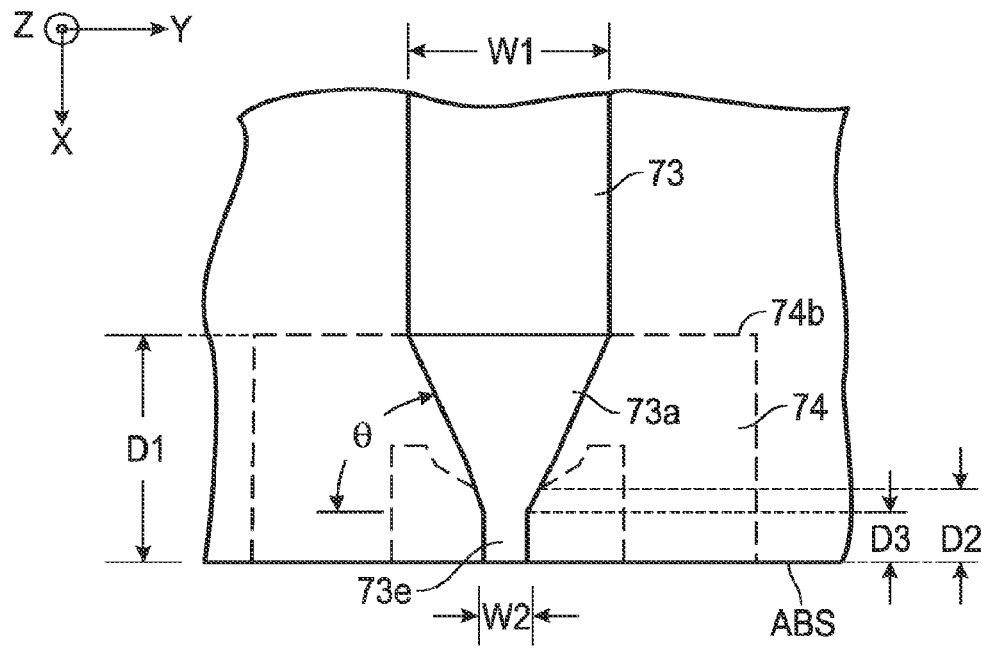
FIG. 5A shows a modification of the tapered waveguide wherein the taper ends at a region recessed from the ABS and includes a non-tapered portion that extends to the ABS.

FIG. 5A shows a modification of the tapered region 73 wherein the taper ends at a region recessed D3 from the ABS, but includes a non-tapered portion 73*e* that extends to the ABS. In this example the portion 73*e* has a fixed width W2 that is preferably at least the cross-track width of the output tip 80. In one example of this modification, D2 was 100 nm, the width W2 of the straight portion 73*e* was 100 nm, and the height D3 of the straight portion 73*e* was less than or equal to D2, e.g., between 50 to 100 nm. In this modification the taper angle is given by $\theta=\tan^{-1}[2(H-D3)/(W1-W2)]$.

Figure 5B:
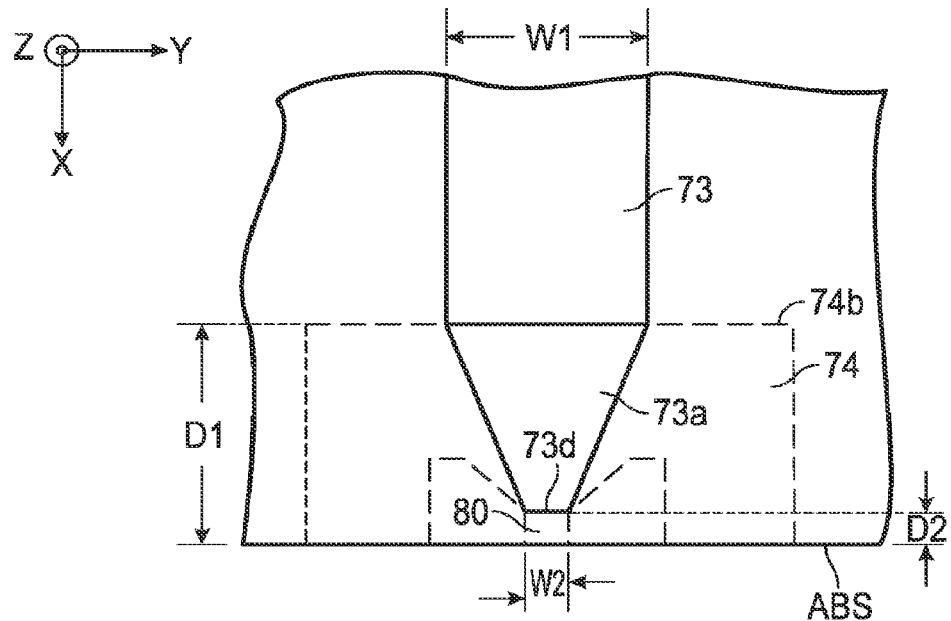
FIG. 5B shows an alternative embodiment of the tapered waveguide wherein the end of the tapered region is recessed from the ABS.

In the preferred embodiment the tapered region 73*a* ends at the ABS so as to be generally coplanar with the end of the output tip 80 at the ABS, as shown in FIG. 3D. In an alternative embodiment, the end 73*d* of tapered region 73*a* ends before the ABS, preferably at a region recessed from the ABS within the height D2 of the output tip 80, as shown in FIG. 5B.

In one example of this embodiment, the width W2 was 100 nm, and the recession from the ABS was 50 nm, which is less than or equal to D2.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally-assisted recording (TAR) head for writing to a magnetic recording layer comprising:
    a head carrier having a recording-layer-facing surface;
    a write pole layer on a surface generally orthogonal to the recording-layer-facing surface of the head carrier and having a tip at the recording-layer-facing surface;
    an optical waveguide layer on the head carrier oriented generally parallel to the write pole layer;
    a near-field transducer (NFT) layer on the head carrier oriented generally parallel to the write pole layer and located between the write pole layer and the optical waveguide layer, the NFT layer having an output tip at the recording-layer-facing surface and an input edge recessed a distance D1 from the recording-layer-facing surface, the output tip having an apex facing the write pole tip and a back edge facing the waveguide layer and wider than the apex; and
    wherein the optical waveguide layer has a thickness generally parallel to the recording-layer-facing surface, a length generally orthogonal to the recording-layer-facing surface, a width that tapers linearly from a width W1 at a region recessed from the recording-layer-facing surface and to a width W2 less than W1 wherein the end of the optical waveguide layer having said width W2 is substantially coplanar with the recording-layer-facing surface.

2. The TAR head of claim 1 wherein the output tip at the recording-layer-facing surface has a generally triangular shape.

3. The TAR head of claim 1 wherein the width W1 is at a recessed distance H from the recording-layer-facing surface, wherein the waveguide has a taper angle θ from W1 to W2 and wherein $\theta=\tan^{-1}[2H/(W1-W2)]$ is between about 40 and 85 degrees.

4. The TAR head of claim 1 further comprising a magnetoresistive read head on the head carrier.

5. A thermally-assisted recording (TAR) disk drive comprising:
    the TAR head of claim 1;
    a laser for directing light to the waveguide; and
    a magnetic recording disk having a magnetic recording layer.

6. The TAR disk dive of claim 5 wherein the magnetic recording layer is patterned into generally concentric tracks containing discrete islands of magnetic material.

7. A thermally-assisted recording (TAR) head for writing to a magnetic recording layer on a magnetic recording disk comprising:
    an air-bearing slider having an air-bearing surface (ABS) for facing the magnetic recording layer on the disk, the ABS having an along-the-track axis and a cross-track axis orthogonal to the along-the-track axis;
    a write pole on the slider and having a tip at the ABS on the along-the-track axis;
    an optical waveguide on the slider having a thickness in the along-the-track axis direction and a tapered surface oriented generally orthogonal to the along-the-track axis, said tapered surface having a width that tapers linearly toward the ABS from a width W1 in the cross-track axis direction at a region recessed a distance H from the ABS to a width W2 less than W1 in the cross-track axis direction wherein the end of the waveguide includes a non-tapered portion that extends from the ABS to the portion of the waveguide where the tapered surface has said width W2, the length of the non-tapered portion extension being a distance D3; and a near-field transducer (NFT) on the slider between the write pole and the optical waveguide, the NFT having a surface parallel to and spaced from said waveguide tapered surface and an output tip at the ABS, the output tip being located on the along-the-track axis between the write pole tip and the waveguide end and having a height D2 greater than or equal to D3 from the ABS to a region recessed from the ABS, the output tip having an apex facing the write pole tip and a back edge wider than the apex in the cross-track axis direction and facing said waveguide tapered surface.

8. The TAR head of claim 7 wherein the output tip at the ABS has a generally triangular shape.

9. The TAR head of claim 7 wherein the end of the optical waveguide having said width W2 is substantially coplanar with the ABS.

10. The TAR head of claim 7 wherein the end of the waveguide having said width W2 is recessed a distance less than or equal to D2 from the ABS.

11. The TAR head of claim 7 wherein said waveguide tapered surface has a taper angle $\theta$ from W1 to W2, and wherein $\theta=\tan^{-1}[2H/(W1-W2)]$ is between about 40 and 85 degrees.

* * * * *